United States Patent [19]

Kobayashi et al.

[11] Patent Number: 5,331,863

[45] Date of Patent: Jul. 26, 1994

[54] MANUAL TRANSMISSION FOR VEHICLE

[75] Inventors: Shogo Kobayashi; Shinji Fujimoto; Hideo Udoh; Keiji Nemoto, all of Wako, Japan

[73] Assignee: Honda Giken Kogyo Kabushiki Kaisha, Tokyo, Japan

[21] Appl. No.: 970,995

[22] Filed: Nov. 3, 1992

[30] Foreign Application Priority Data

Nov. 6, 1991 [JP] Japan .................. 3-090714[U]

[51] Int. Cl.$^5$ .................. F16H 61/16; B60K 20/00
[52] U.S. Cl. .................. 74/476; 74/473 R
[58] Field of Search .................. 74/473 R, 476

[56] References Cited

U.S. PATENT DOCUMENTS

| | | | |
|---|---|---|---|
| 3,866,488 | 2/1975 | Nakata et al. | 74/475 |
| 3,939,724 | 2/1976 | Takahashi et al. | 74/476 |
| 4,133,219 | 1/1979 | Kelbel et al. | 74/476 |
| 4,228,693 | 10/1980 | Kelbel | 74/476 x |
| 4,662,235 | 5/1987 | Kobayashi | 74/476 |
| 5,036,722 | 8/1991 | Park | 74/476 |
| 5,078,020 | 1/1992 | Hasegawa | 74/476 |

FOREIGN PATENT DOCUMENTS

| | | |
|---|---|---|
| 54-006238 | 1/1979 | Japan .................. 74/476 |
| 57-90446 | 6/1982 | Japan .................. 74/476 |
| 64-25555 | 2/1989 | Japan . |
| 1101233 | 7/1989 | Japan . |
| 2-65753 | 5/1990 | Japan . |
| 2183753 | 6/1987 | United Kingdom . |

*Primary Examiner*—Leslie A. Braun
*Assistant Examiner*—David W. Laub
*Attorney, Agent, or Firm*—Armstrong, Westerman, Hattori, McLeland & Naughton

[57] ABSTRACT

A manual transmission for a vehicle, in which any one of a plurality of forward shift stages and a reverse shift stage can selectively be established by movement of a shift member operatively associated with the selecting and shifting operations of a change lever, and the shift member is restrained from moving to a position in which the reverse shift stage is established, by the abutment of the shift member against an engage portion provided on a restraining member which is connected to a drive device and adapted to be moved from an inoperative position to an operative position during forward travelling of the vehicle, wherein the restraining member is provided with an abutment portion against which the shift member is abutable, and the abutment portion is urged by a movement of the shift member operatively associated with the operation of the change lever, thereby forcedly returning the restraining member from the operative position to the inoperative position. When the restraining member has been stuck at the operative position for any reason, the restraining member can be returned to the inoperative position so as to establish the reverse shift stage.

17 Claims, 8 Drawing Sheets

MANUAL TRANSMISSION FOR VEHICLE

BACKGROUND OF THE INVENTION

1. Field of the Invention

The present invention relates to a manual transmission for vehicles, in which any one of a plurality of forward shift stages and a reverse shift stage can, selectively, be established by movement of a shift member operatively associated with the selecting and shifting operations of a change lever, an engage portion provided on a restraining member which is connected to a drive means for moving the restraining member from an inoperative position to an operative position during forward travelling of the vehicle, and the shift member is restrained from moving to a position in which the reverse shift stage is established by the abutment of the shift member against the engage portion.

2. Description of the Related Art

There is known a conventional manual transmission capable of selectively establishing any one of a plurality of forward shift stages and a reverse shift stage, wherein the movement of a shift member for establishing a reverse shift stage is restrained by a restraining member in order to prevent the accidental or inadvertent shifting to the reverse shift stage during forward travelling of a vehicle (for example, see Japanese Patent Application Laid-Open Nos. 25555/89 and 65753/90).

In the manual transmission described in the above-described Japanese Patent Application Laid-Open No. 25555/89, if the vehicle speed exceeds a predetermined speed, a solenoid is energized to protrude the restraining member, so that the restraining member restrains the shift member from moving in a direction to establish the reverse shift stage. However, such restraining member consists of the output shaft of the solenoid and, hence, a load from the shift member acts directly on the solenoid and may worsen the durability of the solenoid.

In the manual transmission described in the above-described Japanese Patent Application Laid-Open No. 5753/90, a hydraulic pressure developed in accordance with an increase in vehicle speed causes a cylinder to be operated, so that a restraining member, consisting of a piston slidably received in the cylinder, is brought into engagement in a groove provided in the shift member. Even in this case, however, a load from the shift member acts directly on the piston, which may worsen the durability of the piston.

Any of the above prior art transmissions is accompanied by a problem that if a trouble happens in the solenoid or a hydraulic system by the load, or the like, received from the shift member, causing the restraining member to stick at an operative position, the movement of the shift member is restrained by the restraining member, resulting in an inability of shifting to the reverse shift stage.

SUMMARY OF THE INVENTION

It is an object of the present invention to reduce the load acting on the drive means for the restraining member to enhance the durability of the drive means, and to enable the reverse shift stage to be established, even if the restraining member should stick.

To achieve the above object, according to a first aspect and feature of the present invention, there is provided a manual transmission for a vehicle, in which any one of a plurality of forward shift stages and a reverse shift stage can selectively be established by movement of a shift member operatively associated with the selecting and shifting operations of a change lever. An engage portion is provided on a restraining means which is connected to a drive means for moving the restraining means from an inoperative position to an operative position during forward travelling of the vehicle. The shift member is restrained from moving to a position in which the reverse shift stage is established, by the abutment of the shift member against the engage portion. The restraining means is provided with an abutment portion against which the shift member is abuttable, and the abutment portion is urged by movement of the shift member operatively associated with the operation of the change lever, thereby forcibly returning the restraining member from the operative position to the inoperative position.

With the first feature of the present invention, when the restraining means has stuck at the operative position for any reason, the abutment portion of the restraining means can be urged by movement of the shift member by means of the change lever, thereby returning the restraining means to the inoperative position to establish the reverse shift stage.

In addition to the first feature, according to a second feature of the invention, there is provided a manual transmission for a vehicle, in which any one of a plurality of forward shift stages and a reverse shift stage can, selectively, be established by movement of a shift member operatively associated with the selecting and shifting operations of a change lever. The shift member is restrained from moving to a position in which the reverse shift stage is established, by the abutment of the shift member against an engage portion provided on a restraining means which is connected to a drive means for movement from an inoperative position to an operative position during forward travelling of the vehicle. The restraining means is bent into a U-shape such that it surrounds a group of loci of movement of the shift member in accordance with the shifting operation. The loci are located on a side of a locus of movement of the shift member in accordance with the selecting operation and the restraining means is pivotally supported, at one end, to a stationary portion through a pivot and is provided at an inner side of the other end, with the engage portion. The engage portion receives from the shift member a load having a line of action through the pivot upon abutment of the restraining means against the shift member. The shift member is further provided with an abutment portion against which the shift member is abuttable. The abutment portion is urged by a movement of the shift member in response to the operation of the change lever and forcibly returns the restraining member from the operative position to the inoperative position.

With the second feature of the invention, the restraining means is compactly formed, thereby reducing a space for location.

Further, according to a third feature of the invention, there is provided a manual transmission for a vehicle, in which any one of a plurality of forward shift stages and a reverse shift stage can selectively be established by movement of a shift member operatively associated with the selecting and shifting operations of a change lever. The shift member is restrained from moving to a position in which the reverse shift stage is established, by the abutment of the shift member against an engage portion provided on a restraining means which is connected to a drive means and adapted to be moved from an inoperative position to an operative position during forward travelling of the vehicle. The restraining means is pivotally supported to a fixing portion through a pivot. A line of action of a load received by the engage portion of the restraining means, from the shift member, passes through the pivot.

With the third feature of the present invention, in restraining the establishment of the reverse shift stage by pivotally moving the restraining means about the pivot by the drive means to bring the shift member into abutment against the restraining means, no rotation moment acts on the restraining means, because the direction of the load, received by the engage portion of the restraining means from the shift member, passes through the pivot. As a result, a burden can be prevented from being applied to the drive means of the restraining means by such load, thereby enhancing the durability of the drive means.

The above and other objects, features and advantages of the invention will become apparent from the following description of the preferred embodiments, taken in conjunction with the accompanying drawings.

BRIEF DESCRIPTION OF THE DRAWINGS

The instant invention will be more fully described and will be better understood from the following description, taken with the appended drawings, in which:

FIGS. 9 and 10 illustrate a second embodiment of the present invention, wherein

FIG. 9 is a view of the second embodiment similar to FIG. 7;

FIG. 10 is a view for explaining the operation of the second embodiment; and

DESCRIPTION OF THE PREFERRED EMBODIMENTS

Figure 1:
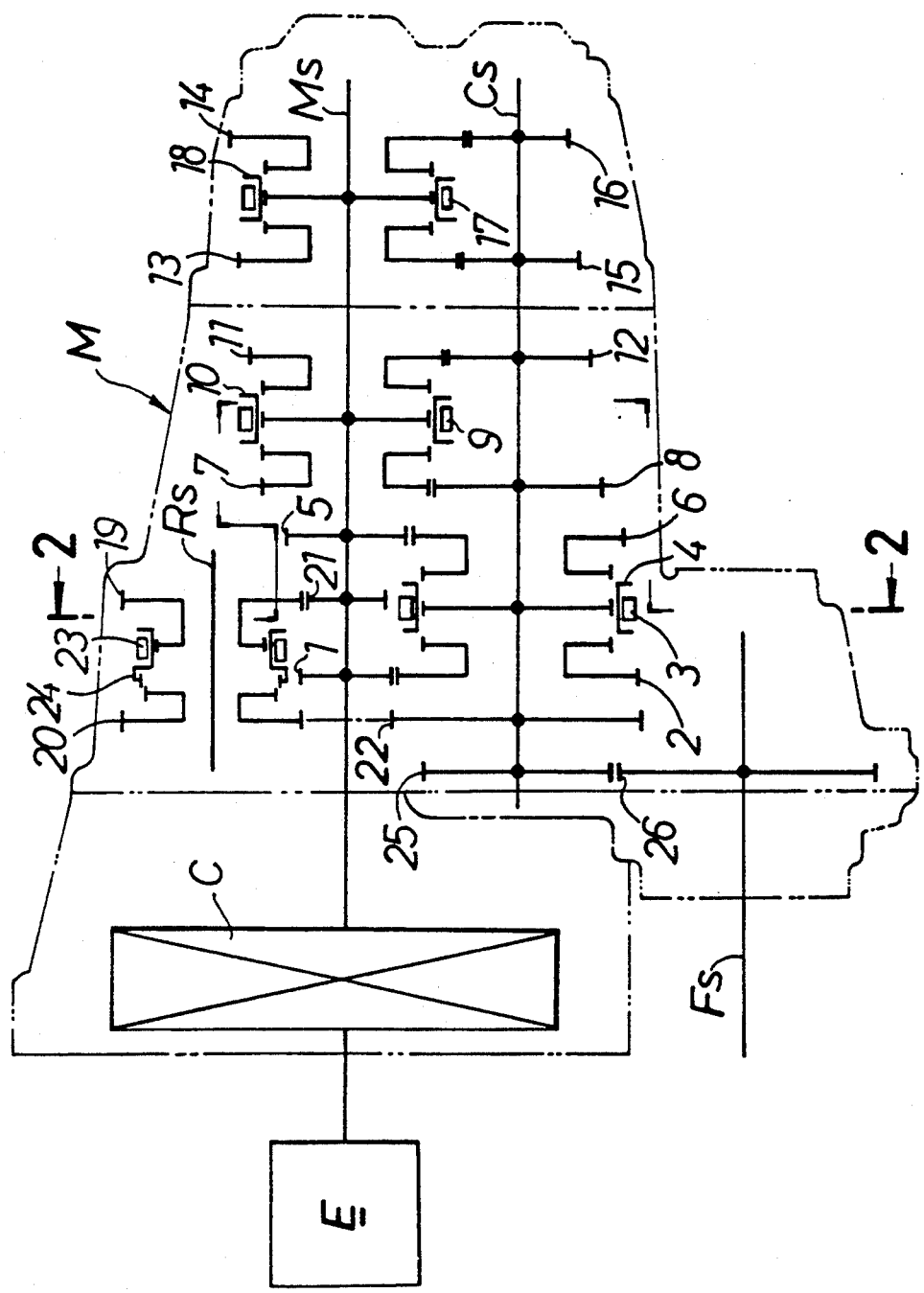
FIG. 1 is a schematic diagram illustrating a manual transmission for a vehicle according to the first embodiment of the invention.

Referring to FIG. 1, in a first embodiment of the invention a transmission M for a vehicle includes six forward shift stages and one reverse shift stage. The transmission M comprises an input shaft Ms connected, in series, to an engine E through a clutch C, and an output shaft Cs, a reverse idle shaft Rs and a final shaft Fs disposed in parallel to the input shaft Ms.

A main first-shift gear 1 is fixedly mounted on the input shaft Ms and is meshed with a counter first-shift gear 2, which is relatively rotatably carried on the output shaft Cs. Thus, a first shift stage is established by coupling the counter first-shift gear 2 to the output shaft Cs by means of a sleeve 4 of a first-second shift synchronization mechanism driven by a first-second shift fork 3. A main second-shift gear 5 is fixedly mounted on the input shaft Ms and meshed with a counter second-shift gear 6 which is relatively rotatably carried on the output shaft Cs. Thus, a second shift stage is established by coupling the counter second-shift gear 6 to the output shaft Cs by means of the sleeve 4.

A main third-shift gear 7 is relatively rotatably carried on the input shaft Ms and meshed with a counter third-shift gear 8 which is fixedly mounted on the output shaft Cs. Thus, a third shift stage is established by coupling the main third-shift gear 7 to the input shaft ms by means of a sleeve 10 of a third-fourth shift synchronization mechanism which is driven by a third-fourth shift fork 9. A main fourth-shift gear 11 is relatively rotatably carried on the input shaft Ms and meshed with a counter fourth-shift gear 12 which is fixedly mounted on the output shaft Cs. Thus, a fourth shift stage is established by coupling the main fourth-shift gear 11 to the input shaft Ms by the sleeve 10. Likewise, a main fifth-shift gear 13 and a main sixth-shift gear 14 are relatively rotatably carried on the input shaft ms. The main fifth-shift gear 13 and the sixth-shift gear 14 are meshed with a counter fifth-shift gear 15 and a counter sixth-shift gear 16 both fixedly mounted on the output shaft Cs, respectively. Thus, a fifth shift and a sixth shift are established by selectively coupling the main fifth-shift gear 13 and the main sixth-shift gear 14 to the input shaft Ms by means of a sleeve 18 of a third-fourth synchronization mechanism which is driven by a fifth-sixth shift fork 17.

A first and a second reverse idle gear 19 and 20 are relatively rotatably carried on the reverse idle shaft Rs. The first reverse idle gear 19 is meshed with a reverse drive gear 21 which is fixedly mounted on the input shaft Ms. And the second reverse idle gear 20 is meshed with a reverse driven gear 22 which is fixedly mounted on the output shaft Cs. Thus, a reverse-shift stage is established by sliding a sleeve 24 of a reverse synchronization mechanism by means of a reverse shift fork 23 to integrally couple the first and second reverse idle gears 19 and 20 with each other.

The rotation of the input shaft Ms is transmitted to the output shaft Cs by any of the first to sixth shift stages and the reverse shift stage, and further, the rotation of the output shaft Cs is transmitted through the final drive gear 25 and the final drive gear 26 to the final shaft Fs.

Figure 2:
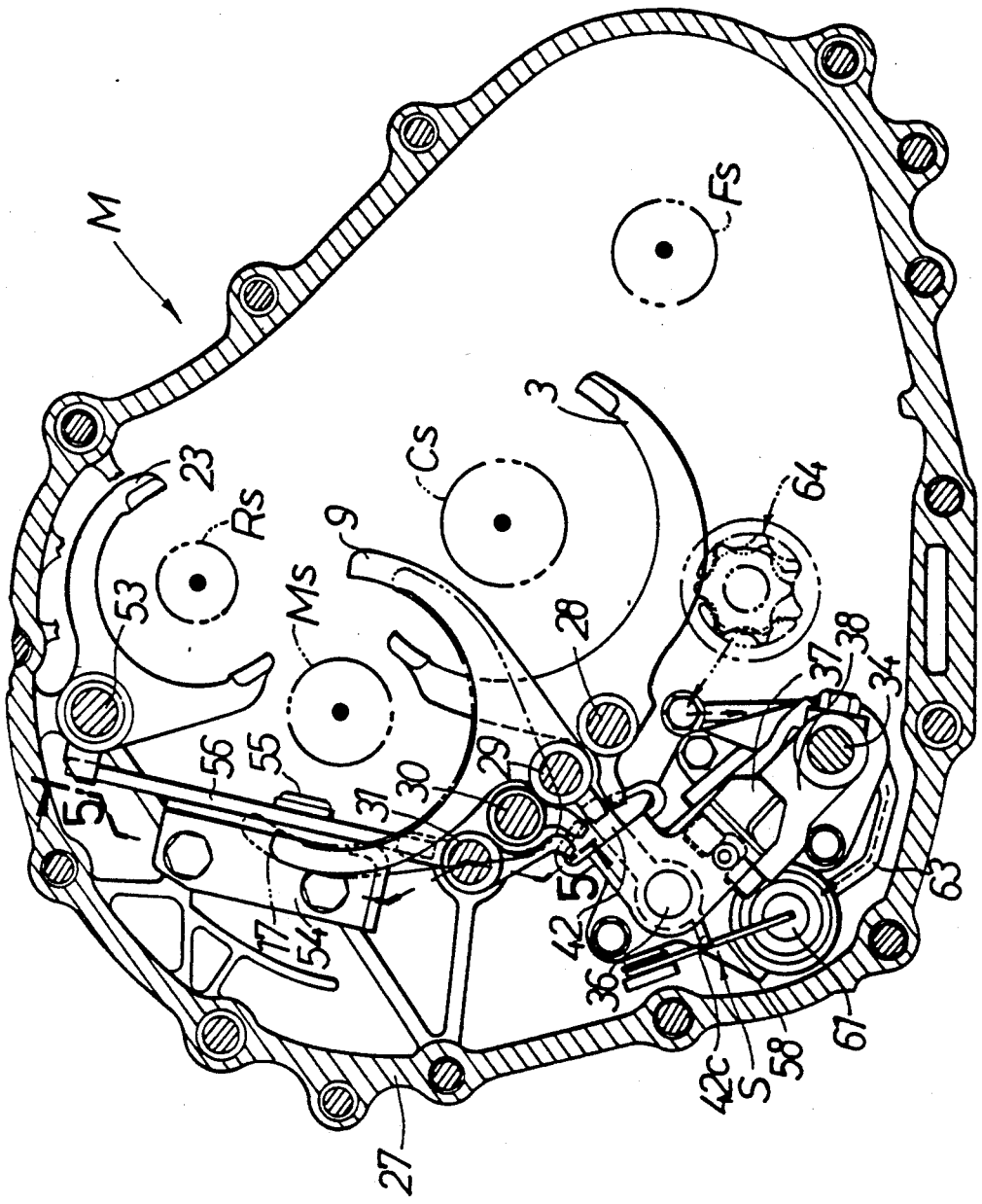
FIG. 2 is a sectional view taken along a line 2—2 in FIG. 1.

As is apparent from FIG. 2, the input shaft Ms, the output shaft Cs and the final shaft Fs are disposed sequentially from a left and upper position to a right ant lower position within a transmission case 27, and the reverse idle shaft Rs is disposed at a position rightward of and above the input shaft Ms.

Four shift rods, i.e., a first-second shift rod 2 supporting the first-second shift fork 3, a third-fourth shift rod 29 supporting the third-fourth shift fork 9, a fifth-sixth shift rod 30 supporting the fifth-sixth shift fork 17 and a first reverse shift rod 31 are disposed parallel to one another at positions leftward of the input shaft Ms and the output shaft Cs. A shift than mechanism S is provided leftward of the four rods 28, 29 30 and 31.

The structure of the shift change mechanism S will described below with reference to FIGS. 2 to 6.

Figure 3:
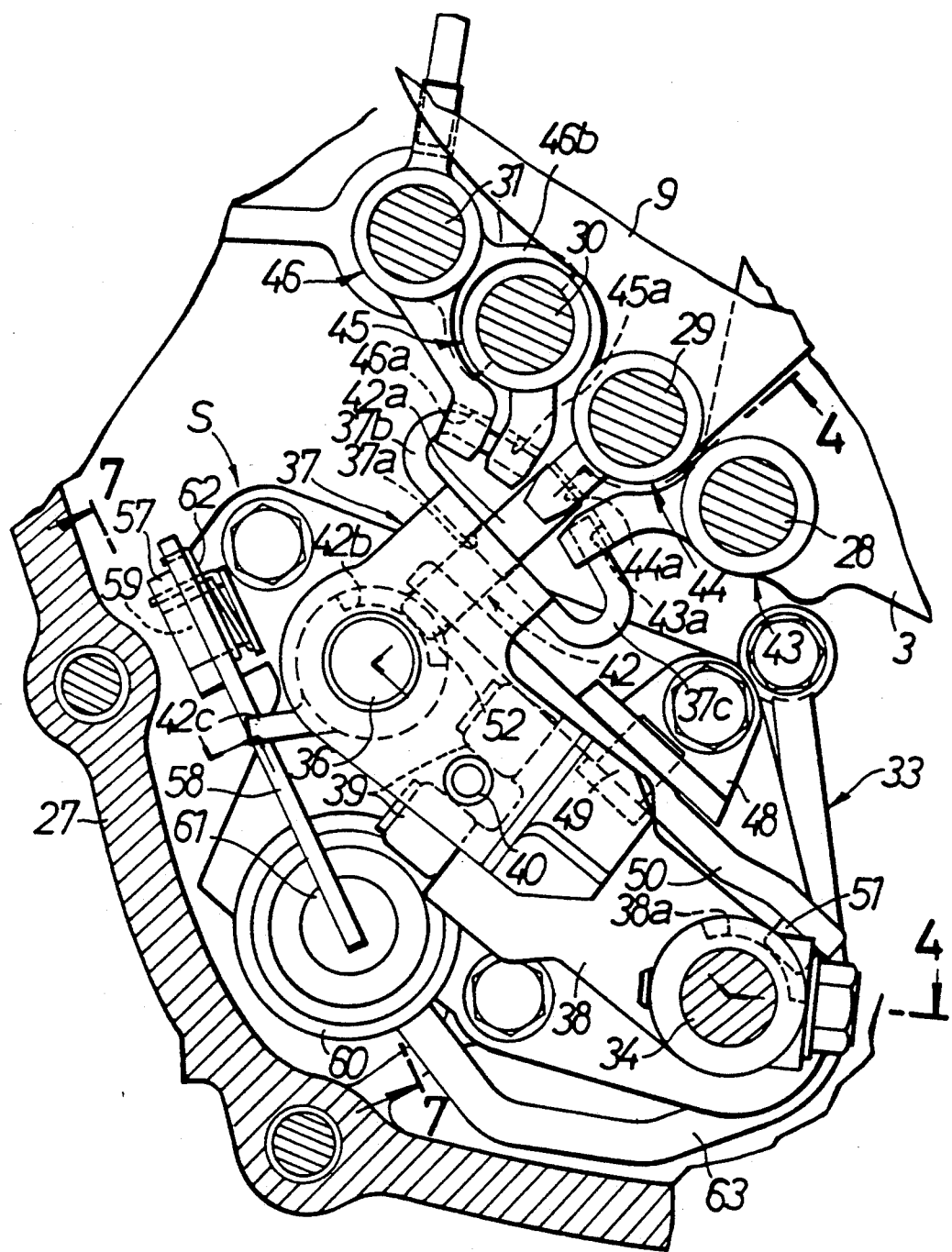
FIG. 3 is an enlarged view of an essential portion shown in FIG. 2.
Figure 4:
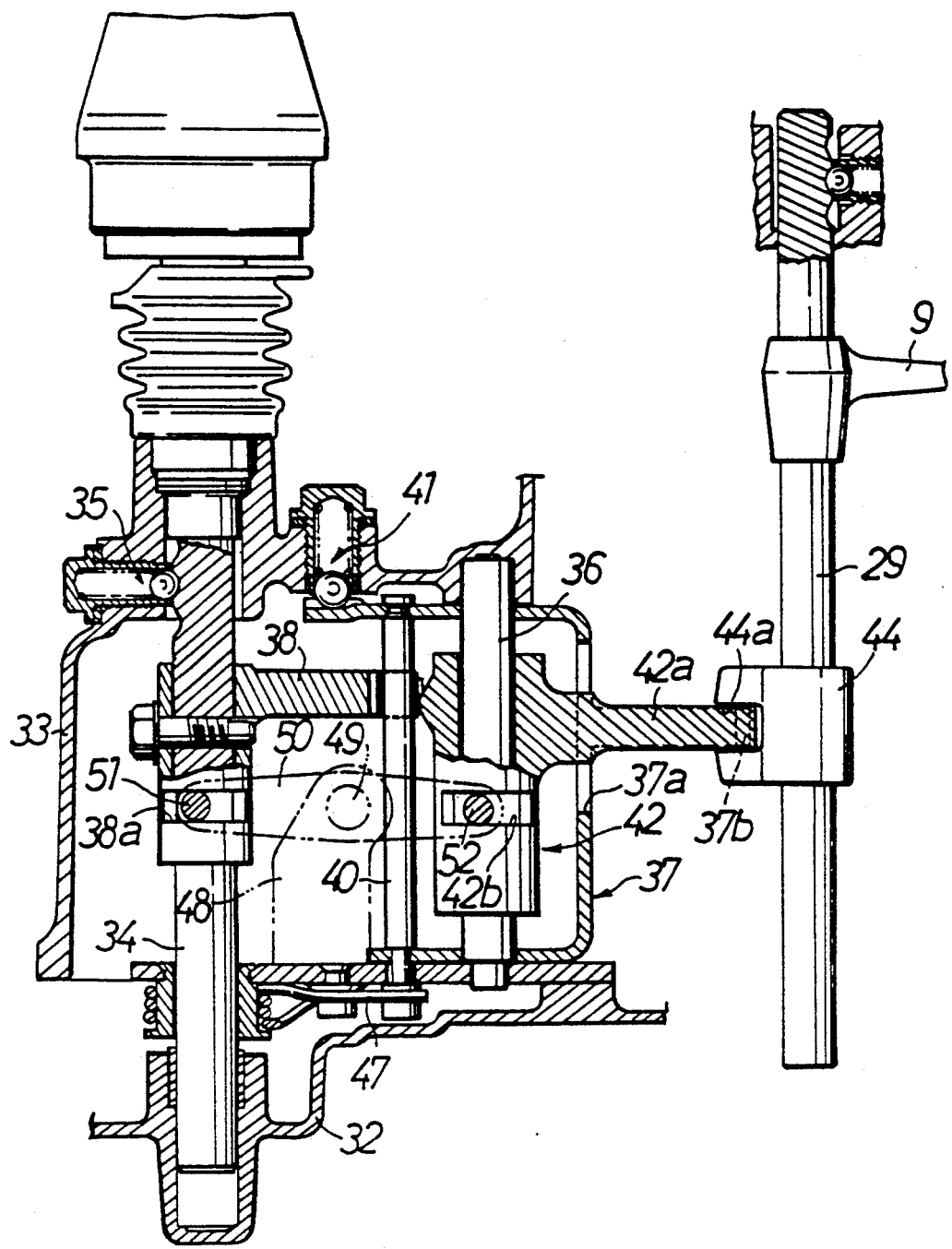
FIG. 4 is a sectional view taken along a line 4—4 in FIG. 3.

As shown in FIGS. 3 and 4, a change rod 34 connected to a change lever (not sown) is axially slidably and rotatably supported between a partition wall 32 of the transmission case 27 and a shift box 33 fixed to the partition wall 32. A neutral position of the change rod 34 and two shift positions thereof on the opposite side of the neutral position are restrained by a detent mechanism 35. In a change lever operation pattern shown in FIG. 6, N designates a neutral position; ① designates a first-shift position; ② designates a second-shift position; ③ designates a first-shift position; ④ designates a fourth-shift position; ⑤ designates a fifth-shift position; ⑥ designates a sixth-shift position; and R designates a reverse position. The selecting operation of the change lever in a direction of an arrow A, causes the change rod 34 to be rotated, and the shifting operation of the change lever in a direction of an arrow B, causes the change rod 34 to slide axially.

A swingable member 37, FIG. 3, is swingably mounted to a pivot 36 which is fixedly mounted in the shift box 33, FIG. 4, in parallel to the change rod 34. An operating arm 38 is secured to the change rod 34. A pin 40 is fixedly mounted to the swingable member 37 to engage two rollers 39, FIG. 3, mounted at a tip end of the operating arm 38. Thus, when the change rod 34 is rotated, the rollers 39 on the operating arm 38, urges the pin 40 so as to cause the swingable member 37 to be swung about the pivot 36. The swingable member 37 is stopped selectively at any of four select positions, namely, a ①-② select position, a ③-④ select position, a ⑤-⑥ select position and a reverse select position, FIG. 6, restrained by a detent mechanism 41, FIG. 4.

A shift arm 42 is axially slidably and rotatably carried on the pivot 36. An elongated hole 37a is provided in the swingable member 3 to extend axially of the pivot 36, and a drive projection 42a of the shift arm 42 extends through the elongated hole 37a to the outside. Thus, when the swingable member 37 is swung, the shift arm 42, having the drive projection 42a urged through the elongated hole 37a, is swung about the pivot 36 along with the swingable member 37. Engage grooves 43a to 46a, FIG. 3, are formed in shift pieces 43 to 46 secured to the four shift rods 28 to 31 and are disposed on a locus of swinging movement of a tip end of the drive projection 42a of the shift arm 42. In this case, the stop position of the swingable member 37 and, thus, the stop position of the shift arm 42, is restrained to a position in which the drive projection 42a of the shift arm 42 engages the engage groove 44a in the third-fourth shift piece 44, by biasing the pin 40 by a resilient force of a spring 47, FIG. 4.

A circumferentially extending elongated groove 38a is provided in a boss portion of the operating arm 38 secured to the change rod 34, FIG. 4. A circumferentially extending elongated groove 42b is provided in a boss portion of the shift arm 42. Two pins 51 and 52 are embedded in opposite ends of a lever 50 which is pivotally supported at its intermediate portion by the pivot 49 on a bracket 48 rising from the shift box 33. The two pins 51 and 52 are engaged in the elongated grooves 38a and 42b, respectively. Thus, when the change rod 34 is moved axially by the shifting operation of the change lever, the lever 50, with one of the pins 51 urged into the elongated groove 38a, is swung about the pivot 49. As a result, the shift arm 42, with the elongated groove 42b urged by the other pin 52, slides in a direction reverse from the direction of sliding movement of the change rod 34, while being guided on the pivot 36 and in the elongated hole 37a in the swingable member 37.

Figure 6:
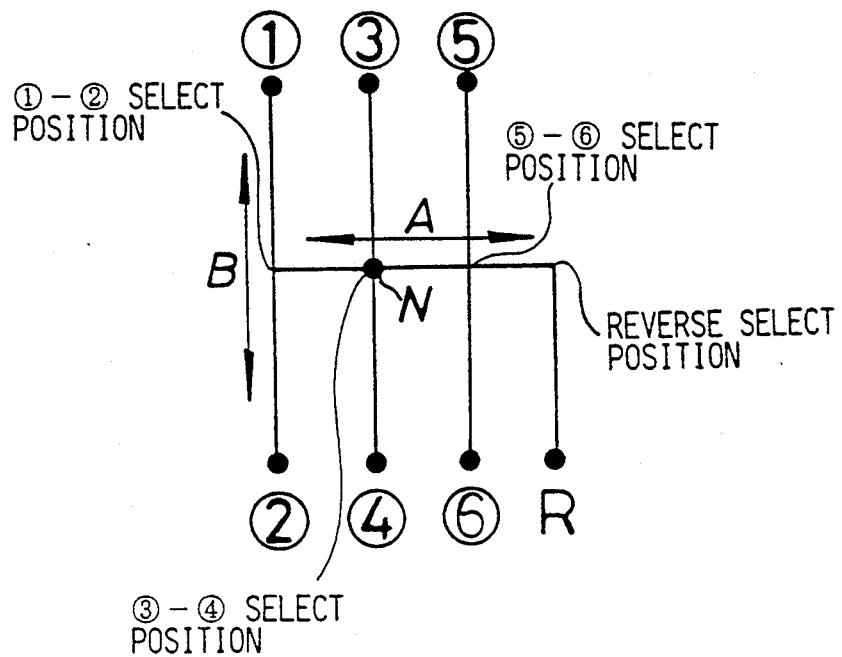
FIG. 6 is a diagram illustrating a shift pattern for a change lever.

When the selecting operation of the change lever in the direction of the arrow A in FIG. 6 is conducted, the shift arm 42 is rotated about the pivot 36 in FIG. 3, so that the drive projection 42a of the shift arm 42 is selectively engaged in any one of the engage grooves 43a to 46a formed in the four shift pieces 43 to 46. When the shifting operation of the change lever in the direction of the arrow B in FIG. 6 is conducted, the shift arm 42 slides along the pivot 36 in FIG. 4, so that any shift piece engaging the drive projection 42a of the shift arm 42 is driven axially, thereby establishing a predetermined shift stage.

The swingable member 37, FIG. 3, is provided with a pair of accurately curved restraining claws 37b and 37c. The tip end of the drive projection 42a of the shift arm 42 is disposed between opposed tip ends of the restraining claws 37b and 37c. As shown in FIG. 3, for example, when the third-fourth shift piece 44 is intended to be driven, the restraining claws 37b and 37c are engaged in the engage grooves 43a, 45a and 46a in the first-second shift piece 43, the fifth-sixth shift piece 45 and the reverse shift piece 46, but not the third-fourth shift piece 44, thereby preventing the inadvertent or accidental operation of the three shift pieces 43, 45 and 46.

Figure 5:
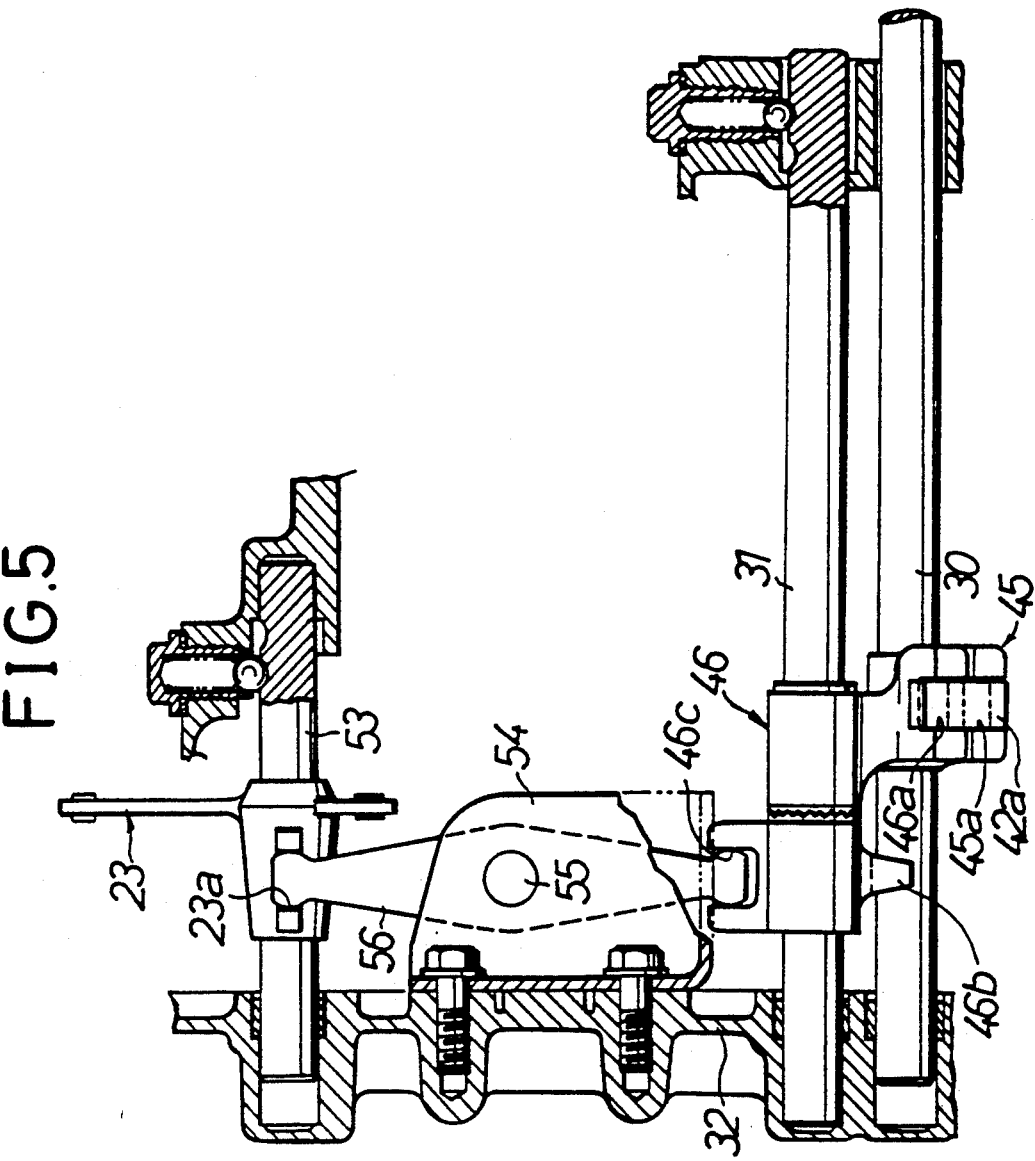
FIG. 5 is a sectional view taken along a Line 5—5 in FIG. 2.

As is apparent from references to FIGS. 2 and 5, the reverse shift piece 46, fixed to the first reverse shift rod 31, is prevented from being rotated by bringing its detent portion 46b into engagement with the adjacent fifth-sixth shift rod 30 for sliding movement. A second reverse shift rod 53 having a reverse shift fork 23 is supported on an upper portion of the transmission case 27, FIG. 2, in parallel to the first reverse shift rod 31. A lever 56, FIGS. 2 and 5, is pivotally supported at its intermediate portion on a bracket 54 which is mounted on the partition wall 32 through a pivot 55. Opposite ends of the lever 56 are engaged in the engage groove 46c formed in the reverse shift piece 46 and the engage groove 23a formed in the reverse shift fork 23, respectively.

Figure 7:
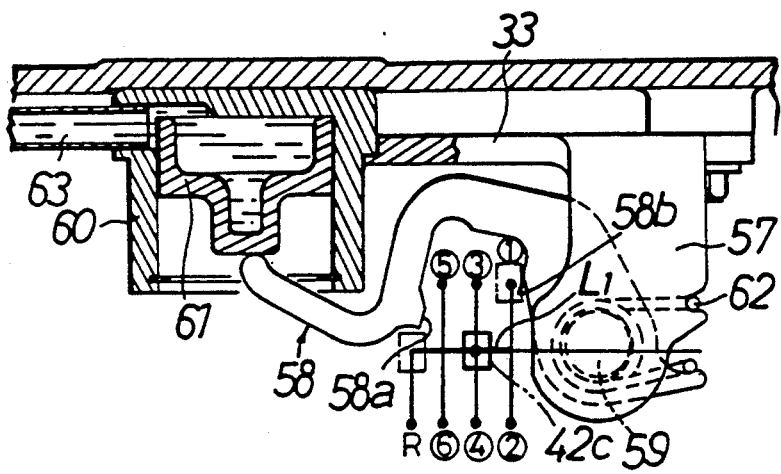
FIG. 7 is a sectional view taken along a line 7—7 in FIG. 3.
Figure 8:
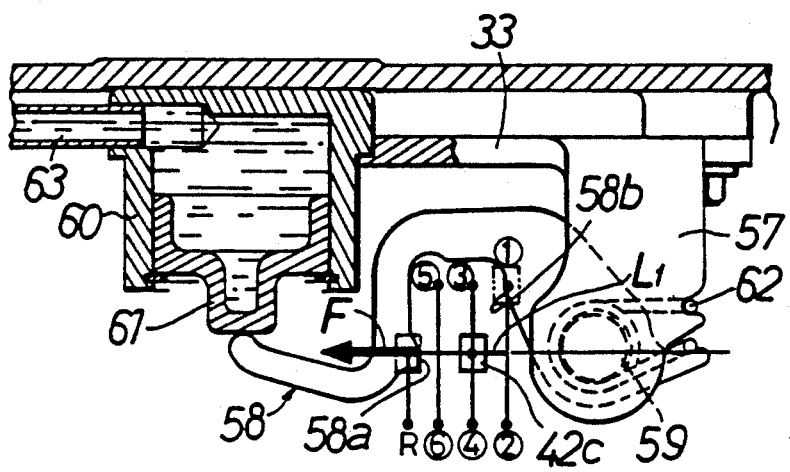
FIG. 8 is a view for explaining the operation.

As is apparent from FIGS. 3, 7 and 8, a restraining member 58 as a restraining means comprising a substantially U-shaped curved plate, with an extension at a tip end, is pivotally mounted at its base end on a bracket 57 on the shift box 33 through a pivot 59. The shift box 33 is provided with a cup-shaped cylinder 60 opened at one end. A piston 61 is slidably received in the cylinder 60. A tip end of the restraining member 58 is opposed to that end face of the piston 61 which is exposed from an opening of the cylinder 60. The tip end of the restraining member 58 is biased in a direction of abutment against the piston 61 by means of a spring 62 mounted between the restraining member 58 and the bracket 57. Thus, if the speed of forward travelling of the vehicle reaches a predetermined value (e.g., several km/hr.) or more, a hydraulic pressure is applied, from an oil pump 64 (see FIG. 2) connected to the output shaft Cs, through an oil passage 63 into the cylinder 60. When this hydraulic pressure overcomes a resilient force of the spring 62, the piston 61 is advanced, causing the restraining member 58 to be swung from an inoperative position shown in FIG. 7 to an operative position shown in FIG. 8. If the speed of forward travelling of the vehicle is less than the predetermined value, the piston 61 is retreated by the resilient force of the spring 62, thereby permitting the restraining member 58 to return from the operative position shown in FIG. 8 to the inoperative position shown in FIG. 7.

The shift arm 42 includes a restraining projection 42c protruding to an opposite side from the drive projection 42a, as can be seen from FIG. 3. The restraining projection 42c protrudes in a plane of swinging movement of the restraining member 58 and is adapted to move along a select line L₁ which connects the following positions: the ①-② select position, the ③-④ select position, the ⑤-⑥ select position and the reverse select position in operative association with the selecting operation of the change lever. Further, the restraining projection 42c is adapted to move perpendicularly to the select line L₁ toward the ① to ⑥ shift positions and the reverse shift position in operative association with the shifting operation of the change lever. The select line L₁ is established on a straight line passing through pivot 59 of restraining member 58.

The restraining member 58 is provided, at an inner side of the tip end of the U-shaped plate, with an engage portion 58a which is adapted to engage the restraining projection 42c to prevent the shift arm 42 from moving from the ⑤-⑥ select position to the reverse select position, when the restraining member 58 is in the operative position. A face of abutment between the restraining projection 42c and the engage portion 58a is set at a right angle with respect to the select line L₁, and the direction of a load F, acting on the engage portion 58a from the restraining projection 42c, coincides with the select line L₁. The restraining member 58 is also provided with a cam portion 58b which is adapted to be engaged by the restraining member 42c, when the shift arm 42 has been shifted to the ① shift position.

The operation of the embodiment of the present invention having the above-described construction will be described below.

Supposing that the selecting operation of the change lever is conducted in the direction of A from the neutral position (the ③-④ select position) shown in FIG. 6, e.g., to the ①-② select position, the change rod 34, FIG. 4, operatively associated with the change lever, is rotated. The operating arm 38 of the change rod 34 urges the pin 40 to cause the swingable member 37 to swing about the pivot 36. Thus, the shift arm 42 engaging in the elongated hole 37a of the swingable member 37, is swung about the pivot 36 in unison with the swingable member 37. As a result, the drive projection 42a of the shift arm 42, FIG. 3, is inserted into the engage groove 43a in the first-second shift piece 43 mounted on the first-second shift rod 28.

Supposing that the shifting operation of the change lever is conducted from this condition in the direction of B in FIG. 6, for example, into the ① shift position or the ② shift position, the change rod 34 slides axially in FIG. 4. The sliding movement of the change rod 34 is transmitted, through the lever 50, to the shift arm 42 to cause the sliding movement of the shift arm 42 along the pivot 36. As a result, the first-second shift piece 43, engaging the drive projection 42a of the shift arm 42, slides, in a direction perpendicular to the sheet of FIG. 3, along with the first-second shift rod 28, causing the first or second shift stage to be established by the first-second shift fork 3 mounted on the first-second shift rod 28.

Likewise, the shifting operation of the change lever into the ③ or ④ shift position, after selecting operation thereof to the ③-④ select position, causes the third or fourth shift stage to be established. The shifting operation of the change lever into the ⑤ or ⑥ shift position, after selecting operation thereof to the ⑤-⑥ select position, causes the fifth or sixth shift stage to be established.

If the selecting operation of the change lever is conducted into the reverse select position, the drive projection 42a of the shift arm 42 is brought into engagement with the reverse shift piece 46 in FIG. 3. When the shifting operation of the change lever is conducted from this condition into the reverse shift position, the reverse shift piece 46 slides in the leftward direction, as viewed in FIG. 5, along with the first reverse shift rod 31. As a result, the second reverse shift rod 53 connected through the lever 56 to the first reverse shift rod 31, slides in a rightward direction along with the reverse shift fork 23, thereby establishing the reverse shift stage.

If the shift arm 42 is moved in operative association with the selecting and shifting operations of the change lever, the restraining projection 42c, provided on the shift arm 42, is moved according to the pattern shown in FIG. 6. When the speed of forward travelling of the vehicle is less than the predetermined value, the oil pressure acting on the cylinder 60 is low, and the restraining member 58 is maintained at the inoperative position, shown in FIG. 7, by the resilient force of the spring 62. Therefore, the restraining projection 42c can be freely moved to any of the ① to ⑥ shift positions and the reverse shift position without interference with the restraining member 58.

If the forward speed of the vehicle reaches and exceeds the predetermined value and the oil pressure is sufficient to overcome the resilient force of the spring 62 applied to the cylinder 60, the piston 61 is advanced, causing the restraining member 58 to swing to the operative position shown in FIG. 8. When the selecting operation of the change lever is conducted toward the reverse select position at this time, the restraining projection 42c is moved in the leftward direction as viewed in FIG. 8 along the select line L₁. But in the course of this movement, the restraining projection 42c abuts against the engage portion 58a provided on the restraining member 58. Hence, the change lever cannot reach the reverse select position from the ⑤-⑥ select position in FIG. 6. This avoids inadvertent or accidental establishment of the reverse shift stage during forward travelling of the vehicle.

When the restraining projection 42c has abutted against the engage portion 58a of the restraining member 58, in the course of the movement thereof along the select line L₁, the select line L₁ lies on the straight line passing through the pivot 59, and the restraining projection 42c and the engage portion 58a abut against each other in a plane perpendicular to the select line L₁. For this reason, the direction of a load F, acting on the engage portion 58a of the restraining member 58 from the restraining projection 42c, is in a direction of the select line L₁, i.e., is on the line passing through the pivot 59 of the restraining member 58, and such load F cannot produce a rotational moment on the restraining member 58. Therefore, the load F applies no burden to the cylinder 60 and the piston 61, and cannot exert any influence to the durability of the cylinder 60 and the piston 61.

If the piston 61 has stuck at the position shown in FIG. 8, for any reason, notwithstanding that the travel speed of the vehicle has become less than the predetermined value, the restraining member 58 is retained at the operative position, thereby making it impossible to establish the reverse shift stage. In this case, by the shifting operation of the change lever to the ① shift position after selecting operation thereof to the ①-② select position shown in FIG. 6, the restraining projection 42c is moved from the ①-② select position shown in FIG. 8 to the ① shift position and, in the course of this movement, the projecting 42c abuts against the cam portion 58b of the restraining member 58. As a result, the restraining member 58 is forcibly swung from the operative position shown in FIG. 8 toward the inoperative position shown in FIG. 7, thereby making it possible again to establish the reverse shift stage.

Since the restraining member 58 is formed in a U-shape surrounding the ①, ③ and ⑤ shift positions, this contributes to reducing space for location of the restraining member 58. Further, the cylinder 60 of the drive means is disposed in a space between the extension and an outer side of the U-shaped restraining member, thereby leading to a further compact arrangement.

Figure 9:
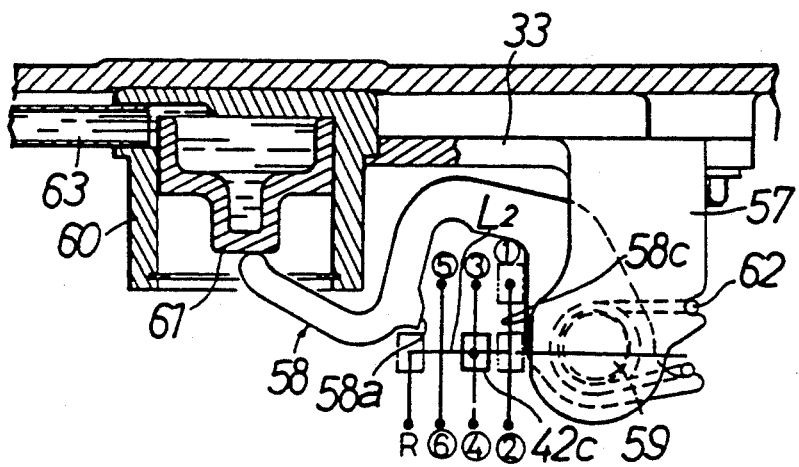
Figure 10:
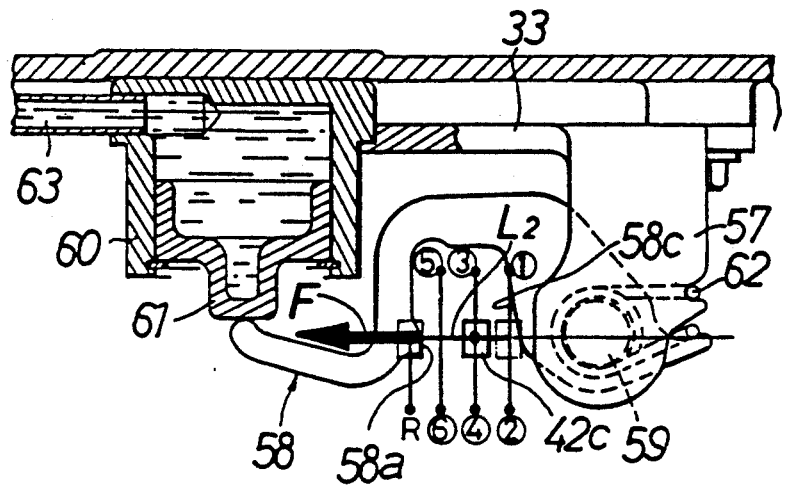

FIGS. 9 and 10 illustrate a second embodiment of the present invention.

A feature of this embodiment is the shape of a cam portion 58c of a restraining member 58 which is different from the shape of the cam portion 58b in the previously-described first embodiment. Other portions of the construction are the same as those of the first embodiment.

With the second embodiment, if the restraining member 58 has stuck at an operative position, shown in FIG. 10, the cam portion 58c can be urged by the restraining projection 42c only by moving the restraining projection 42c toward a ①-② select position along a select line $L_2$, whereby the restraining member 58 can return to an inoperative position shown in FIG. 9.

Figure 11:
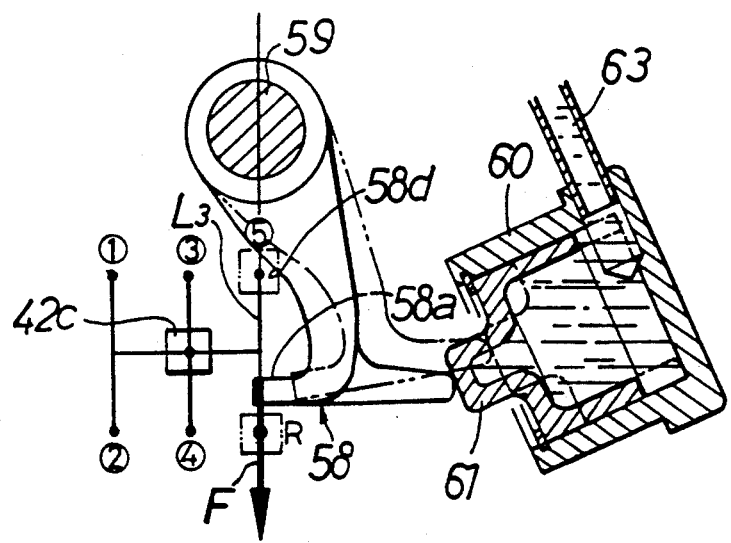
FIG. 11 is a view similar to FIG. 7, but illustrating a third embodiment of the present invention.

FIG. 11 illustrates a third embodiment of the present invention.

This embodiment is applied to a manual transmission in which a forward shift stage and a reverse shift stage are provided in correspondence to a common select position, such as a manual transmission having five forward shift stages and a reverse shift stage. In this embodiment, if a hydraulic pressure is applied to the cylinder 60 to swing the restraining member 58 by the piston 61 to an operative position shown by a solid line in FIG. 11, the restraining projection 42c can be prevented by the engage portion 58a of the restraining member 58 from being moved on a shift line $L_3$ to a reverse shift position, thereby inhibiting the establishment of the reverse shift stage. At this time, the shift line $L_3$ lies on a straight line passing through the pivot 59, and the restraining projection 42c and the engage portion 58a abut against each other in a plane perpendicular to the shift line L. Hence, the direction of a load F acting on the engage portion 58a from the restraining projection 42c lies on the straight line passing through the pivot 59. This ensures that a rotational moment can be prevented from being generated on the restraining member 58 by the load F, and the load on the cylinder 60 and the piston 61 can be reduced.

Suppose that the restraining member 58 ms stuck at the operative position. As shown by a dashed line in FIG. 11, the shifting operation of the change lever causing the restraining projection 42c to move directly to a ⑤ shift position along the shift line $L_3$ enables the restraining projection 42c to urge a cam portion 58d of the restraining member 58 so that the restraining member 58 can be returned to an inoperative position.

Although the embodiments of the present invention have been described in detail, it will be understood that the present invention is not limited to the above-described embodiments, and various minor modifications can be made without departing from the scope of the present invention defined in accompanying drawings.

For example, in the above-described embodiments, when the restraining projection 42c of the shift arm 42 is brought into abutment against the engage portion 58a of the restraining member 58, the restraining projection 42c is moved on the straight line passing through the pivot 59 of the restraining member 58 (namely, on the select lines $L_1$ and $L_2$ in the first and second embodiments, and on the shift line $L_3$ in the third embodiment), but the restraining projection 42c is not necessarily required to move on the straight line passing through the pivot 59. In this case, however, it is necessary to bring the direction of a load F acting on the engage portion 58a from the restraining projection 42c into coincidence with the straight line passing through the pivot 59 by a means for properly changing the angle of the face of abutment between the restraining projection 42c of the shift member 42 and the engage portion 58a of the restraining member 58 or by another means.

In addition, in place of the drive means for the restraining member 58 being comprised of a hydraulically operated cylinder 60 and piston 61, it is possible to employ other means such as a solenoid.

What is claimed is:

1. A manual transmission for a vehicle comprising:
   a shifting means for selectively establishing one of a plurality of forward shift stages and a reverse shift stage in the transmission, said shifting means comprising a shift member operatively associated with a change lever;
   a restraining means for restraining actuation of said shifting means;
   a drive means for urging said restraining means to an operative position during forward travelling of the vehicle,
   wherein said restraining means includes an engage portion contacting said shift member for restraining the movement of said shift member to a position for selecting the reverse shift stage when in the operative position, said restraining means further including an abutment portion against which said shift member is abuttable, and
   wherein a predetermined movement of said shift member in response to the operation of said change lever urges said shift member against said abutment portion when said restraining means is in the operative position to forcibly return said restraining means to an inoperative position.

2. A manual transmission for a vehicle according to claim 1, wherein said restraining means is pivotally supported to a stationary portion through a pivot, and a line of action of a load acting on the engage portion of said restraining means from said shift member passes through said pivot.

3. A manual transmission for a vehicle according to claim 2, wherein said restraining means is forcibly returned from the operative position to the inoperative position by movement of said shift member operatively associated with the shifting operation of said change lever to a predetermined forward shift stage.

4. A manual transmission for a vehicle according to claim 2, wherein said restraining means is forcibly returned from the operative position to the inoperative position by movement of said shift member operatively associated with the selecting operation of said change lever to a predetermined forward shift stage.

5. A manual transmission for a vehicle according to claim 2, wherein said change lever has a shift position for a predetermined forward shift stage and a shift position for the reverse shift stage on a common line of the shifting operation line, and said restraining means is forcibly returned from the operative position to the inoperative position by movement of said shift member operatively associated with the shifting operation of said change lever to said predetermined forward shift stage.

6. A manual transmission for a vehicle according to claim 1, wherein said restraining means is forcibly returned from the operative position by movement of said shift member operatively associated with the shifting operation of said change lever to a predetermined forward shift stage.

7. A manual transmission for a vehicle according to claim 1, wherein said change lever has a shift position for a predetermined forward shift stage and a shift position for the reverse shift stage on the same shift operation line, and said restraining means is forcibly returned from the operative position to the inoperative position by movement of said shift member operatively associated with the shifting operation of said change lever to said predetermined forward shift stage.

8. A manual transmission for a vehicle according to claim 1, wherein said restraining means is forcibly returned from the operative position to the inoperative position by movement of said shift member operatively associated with the selecting operation of said change lever to a predetermined forward shift stage.

9. A manual transmission for a vehicle as recited in claim 1, wherein said restraining means is pivotally supported to a stationary portion through a pivot, and a line of action of a load acting on the engage portion of said restraining means from said shift member passes through said pivot.

10. A manual transmission for a vehicle as recited in claim 1, wherein said drive means urges said restraining means to the operative position during forward travelling of the vehicle above a predetermined forward speed.

11. A manual transmission for a vehicle as recited in claim 10, wherein said drive means comprises a piston movable in a cylinder under hydraulic pressure for urging said restraining means to the operative position and a resilient means is provided for urging said restraining means to the inoperative position.

12. A manual transmission for a vehicle, as recited in claim 1 wherein said restraining member is bent into a U-shape surrounding a group of loci of movement of said shift member in accordance with the shifting operation, said loci being located on a side of a locus of movement of said shift member in accordance with the selecting operation, said restraining member being pivotally supported at one end on a stationary portion through a pivot and being provided at an inner side of the other end with said engage portion, and said engage portion receiving from said shift member a load having a line of action through the pivot upon abutment of the restraining means against the shift member.

13. A manual transmission for a vehicle according to claim 12, wherein said restraining means is forcibly returned from the operative position to the inoperative position by movement of said shift member operatively associated with the selecting operation of said change lever to a predetermined forward shift stage.

14. A manual transmission for a vehicle according to claim 12, wherein said restraining means is forcibly returned from the operative position to the inoperative position by movement of said shift member operatively associated with the shifting operation of said change lever to a predetermined forward shift stage.

15. A manual transmission for vehicle according to claim 12, wherein an extension is provided on said other end of said restraining means so as to extend in an opposite direction from the pivot with respect to the engage portion, a tip end of the extension being operatively connected to said drive means, said drive means being disposed in a space defined between the extension and an outer side of said U-shape restraining means.

16. A manual transmission for a vehicle according to claim 15, wherein said restraining means is forcibly returned from the operative position to the inoperative position by movement of said shift member operatively associated with the shifting operation of said change lever to a predetermined forward shift stage.

17. A manual transmission for a vehicle according to claim 15, wherein said restraining means is forcibly returned from the operative position to the inoperative position by movement of said shift member operatively associated with the selecting operation of said change lever to a predetermined forward shift stage.

* * * * *